United States Patent
Wiese et al.

[11] Patent Number: 5,080,211
[45] Date of Patent: Jan. 14, 1992

[54] VISCOUS COUPLING HAVING PLATES WITH INDEX RECESSES

[75] Inventors: Helmut Wiese, Neunkirchen-Seelscheid; Herbert Taureg, Hennef, both of Fed. Rep. of Germany

[73] Assignee: Viscodrive GmbH, Lohmar, Fed. Rep. of Germany

[21] Appl. No.: 623,282

[22] Filed: Dec. 5, 1990

[30] Foreign Application Priority Data

Dec. 7, 1989 [DE] Fed. Rep. of Germany ....... 3940406

[51] Int. Cl.$^5$ ............................................. F16D 31/00
[52] U.S. Cl. ................... 192/58 B; 192/58 C; 192/70.14
[58] Field of Search ............... 192/58 A, 58 B, 58 C, 192/70.14; 475/87

[56] References Cited

U.S. PATENT DOCUMENTS

| | | | |
|---|---|---|---|
| 4,238,015 | 12/1980 | Schmida | 192/58 B |
| 4,736,828 | 4/1988 | Diessner | 192/70.14 |
| 4,889,206 | 12/1989 | Weise et al. | 192/58 C X |
| 4,923,041 | 5/1990 | Stockmar | 192/58 B |
| 4,989,687 | 2/1991 | Knoka et al. | 192/58 C X |

Primary Examiner—Allan D. Herrmann
Assistant Examiner—Andrea Pitts
Attorney, Agent, or Firm—Toren, McGeady & Associates

[57] ABSTRACT

A viscous coupling having outer plates which are provided with index recesses which serve to assemble the outer plates in a specific way relative to each other, depending on the respective application. If the outer plates have to be assembled in the housing with the apertures being aligned inphase relative to each other, the torque transmitting capacity of the coupling is lower than in those cases where the slots are circumferentially offset relative to each other in the housing, thereby forming a kind of labyrinth, in which case the viscous coupling achieves a 100% torque transmission because it may be transferred into the hump mode.

7 Claims, 2 Drawing Sheets

VISCOUS COUPLING HAVING PLATES WITH INDEX RECESSES

BACKGROUND OF THE INVENTION

The invention relates to a viscous coupling having a housing and at least one hub rotatably supported therein and relatively thereto. The coupling also has sets of plates which are associated with the housing and the hub(s), which are arranged in a certain sequence and which comprise apertures. The plates associated with the housing or hub(s) are provided with index recesses for assembly purposes. Additionally, a viscous medium, especially silicone oil, at least partially fills the internal space which remains between the housing and the hub(s) and which is not occupied by plates.

In the case of viscous couplings, it is known to provide the outer plates associated with the housing with two diametrically opposed index recesses which serve to align the plates in their positions relative to each other.

Depending on the application of viscous couplings which, above all, are used in vehicle construction, the plates have to be differently assembled relative to each other. For example, with viscous couplings used in the driveline between the front and rear wheels of a four wheel drive vehicle it is necessary for the slots of the outer plates arranged in the housing in an axial sequence to be offset relative to each other in the circumferential direction, thereby forming a kind of labyrinth to facilitate the transfer of the coupling into the so-called hump mode. However, with different applications it is necessary to achieve different characteristics of the torque/speed curve. For instance, a 100% torque transmission is to be avoided; only part of the input torque is to be transmitted.

With such a viscous coupling design, the apertures of the slots have to be aligned so that their positions correspond to each other.

However, with the prior art design there is a problem in that there exist no accurate means of checking whether the specified assembly sequence and alignment of the plates have actually been observed.

SUMMARY OF THE INVENTION

Accordingly, it is an object of the present invention to provide a viscous coupling and a process for assembling the viscous coupling which ensure the required positional alignment of the coupling plates for the respective application.

Pursuant to this object, and others which will become apparent hereafter, one aspect of the present invention resides in providing two index recesses per plate, with the first index recess being arranged so as to correspond to an aperture, and with the second index recess being arranged between two apertures of the plate. The advantage of this design is that, for assembly purposes, there are two possible alternative associations of the plates relative to each other. If the viscous coupling is to have low torque transmitting characteristics, assembly takes place in such a way that the first index recesses are aligned in their positions relative to each other. This also ensures that all apertures are positioned so as to correspond to each other. If the object is to assemble a coupling capable of having a hump effect, the first recess of a first plate and the second recess of a second plate are arranged in coinciding and aligned positions relative to each other. The aligned recesses allow the introduction of a test bar via which it is possible to determine whether the recesses of the individual plates are actually aligned relative to each other.

By determining the depth of introduction into the coupling housing it is also possible to find out whether all plates are in the required position relative to each other. If assembly is to take place in such a way as to obtain a viscous coupling with low torque values, with the first and second recesses being positionally aligned along the entire axial length of the plate package, the channels formed by the first and second recesses have to be open to permit the introduction of the test bar. If the coupling is to be capable of having a hump effect, only one channel is allowed to be formed for introducing the test bar. Because of the alternating assembly and the offset arrangement of the index recesses, the other recesses are offset relative to each other, and it is not possible to insert a test bar.

According to a further embodiment of the invention, the second index recesses are arranged centrally between two apertures. They are preferably offset relative to the first apertures at a sufficient circumferential distance to avoid weakening the plates unnecessarily in a concentrated region.

The checking process is facilitated if the index recesses differ in respect of their cross-sections. In this way, a faulty assembly is excluded altogether. It is not only ensured that the circumferential offset does exist, but also that the direction of the circumferential offset is correct.

In a preferred embodiment, the second index recess has a smaller cross-section than the first index recess.

In order to avoid any out-of-balance, it is proposed that the two index recesses should be associated with diametrically opposed, identical, further index recesses. These may also be used for assembly purposes. The two index recesses are preferably provided in the plates associated with the housing.

In a further embodiment, the index recesses start from the outer circumference of the plates.

As far as the assembly in accordance with the invention is concerned, the plates provided with the index recesses should be inserted into the housing either with the first recesses being in congruent positions or with the first and second index recesses of the successive plates being positionally aligned.

For checking purposes, after the plates have been assembled, a test bar whose cross-section is adapted to that of the index recesses is introduced into the aligned index recesses.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF PREFERRED EMBODIMENTS

Figure 1:
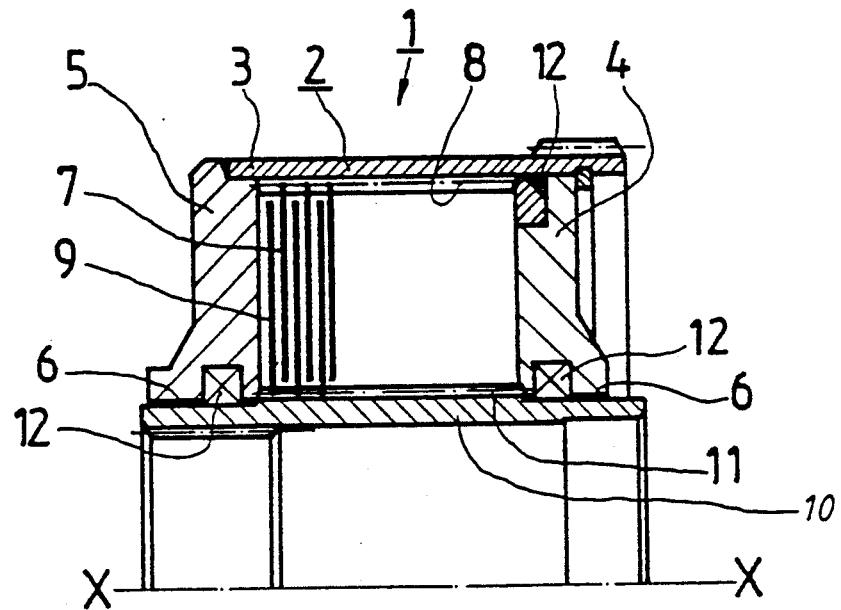
FIG. 1 is a diagrammatic view of the viscous coupling pursuant to the present invention.

The viscous coupling 1 illustrated in FIG. 1 substantially consists of a housing 2 formed of a cylindrical housing casing 3 and two covers 4, 5. The housing casing 3 is provided with teeth 8 extending parallel to the axis X—X. One of the two covers, i.e., cover 5, is firmly connected to the housing casing 3 whereas the other cover 4 is removable.

A hub 10 is rotatably supported in bores 6 of the two covers 4, 5 of the housing 2. On its outer face, the hub 10 is provided with teeth 11 which also extend parallel to the axis X—X. In the teeth 8 of the housing 2, annular outer plates 7 are arranged so as to be distributed along the length of the internal space and along the axis X—X. For this purpose, the outer plates 7 are spaced by spacing rings. Between each two outer plates 7, inner plates 9 are non-rotatingly but axially movably accommodated in the teeth 11 of the hub 10. A different sequence for arranging the outer plates 7 and the inner plates 9 is also conceivable.

The hub 10 is sealed by seals 12 relative to the covers 4, 5 of the housing. The removable cover 4 is sealed relative to the housing casing 3 via a seal 12. The hub 10 of the viscous coupling 1 may be connected to a drive, for example, with the housing 2 being non-rotatingly connected to the part to be driven. The part of the internal space between the housing 2 and the hub 10 not occupied by plates 7, 9 is at least partially filled with a viscous medium such as silicone oil. The plates 7, 9 are provided with apertures. If a speed differential occurs between the driven hub 10, for example, and the housing 2 to be driven, the viscous medium is sheared, which, because of the resulting rise in temperature, causes expansion and an increase in the internal pressure in the viscous coupling 1 so that with an increasing speed differential, an increasing torque can be transmitted. The kind of arrangement of the plates 7 relative to each other in the housing determines the torque characteristics.

Figure 2:
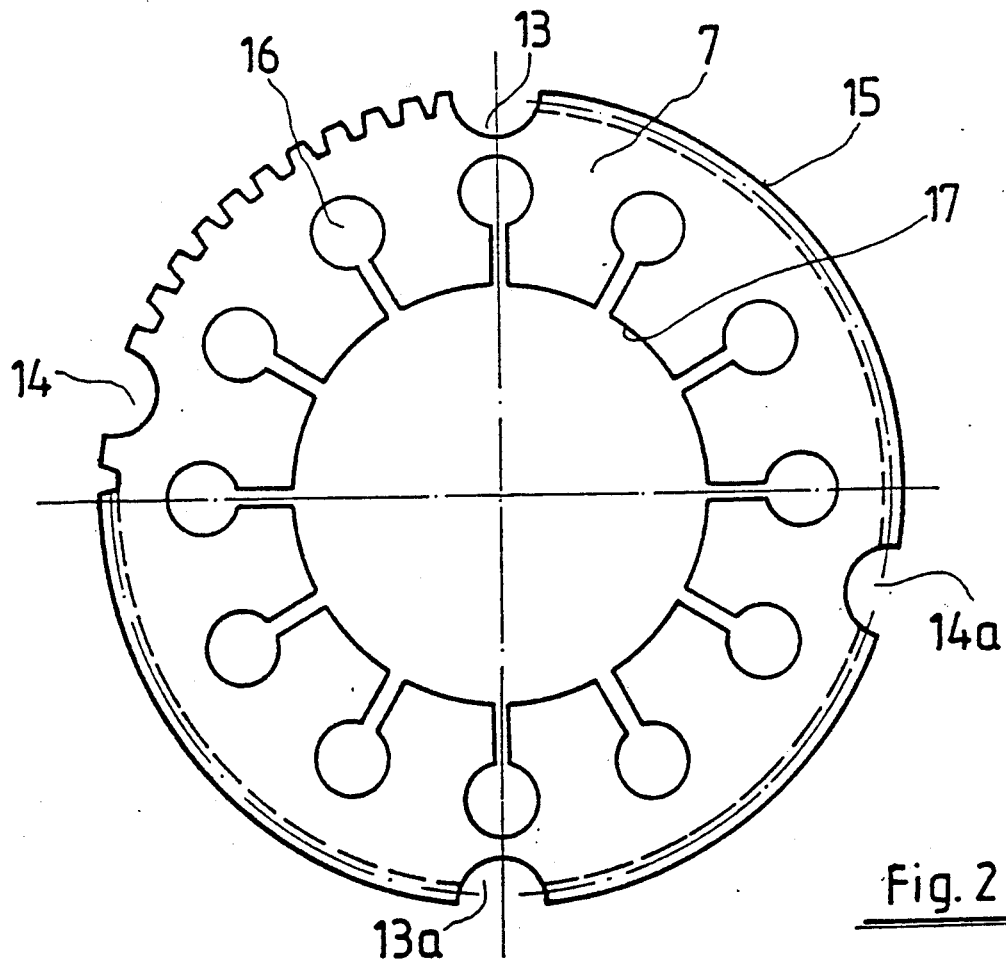
FIG. 2 is a side view of an individual plate associated with the housing and provided with index recesses.
Figure 3:
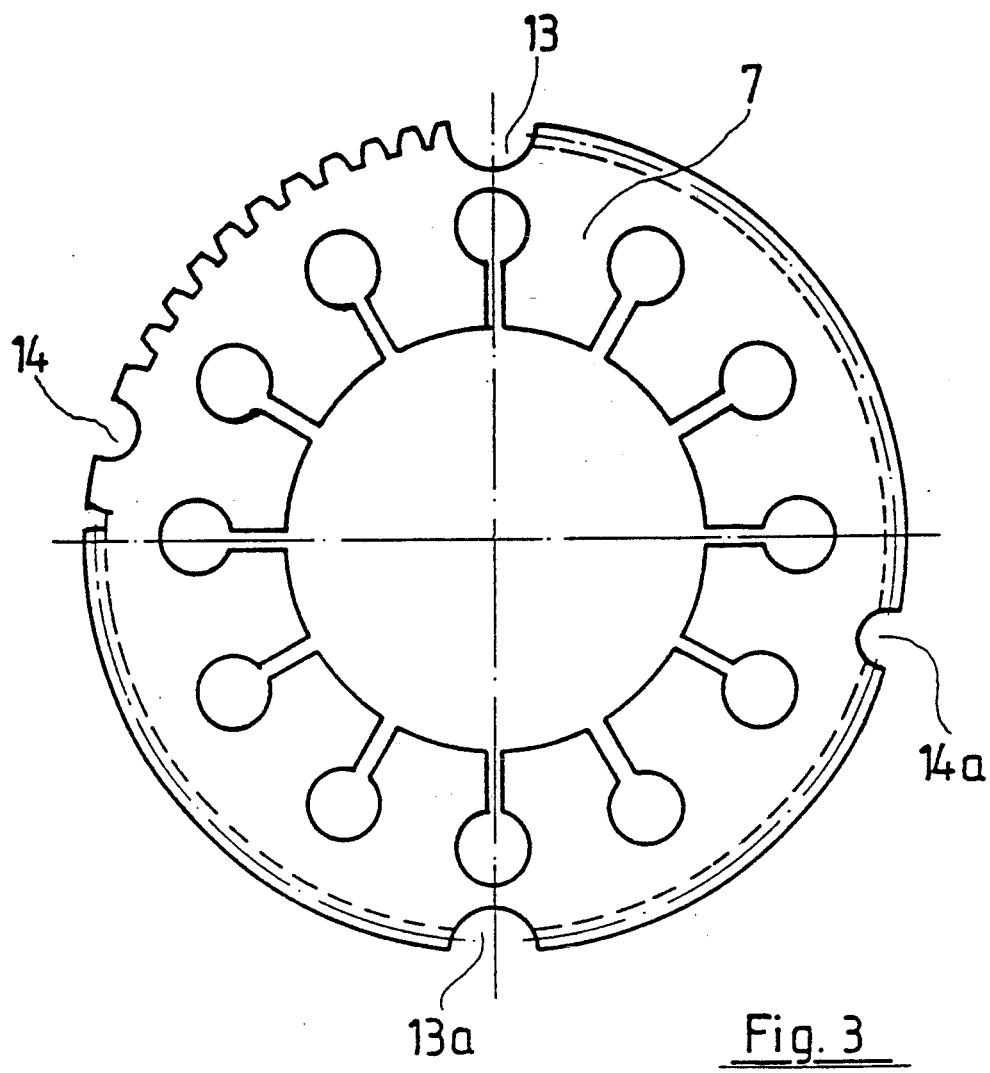
FIG. 3 is a side view of a plate having different index recesses.

As can be seen in FIGS. 2 and 3, the outer plates 7 are provided with circumferentially distributed apertures 16 in the form of slots 16. The slots start from the circumference of the bore 17 in the outer plate 7. They extend from the radial inside to the outside along part of the radial thickness of the plates 7. The outer circumference 15 is provided with teeth by means of which the outer plate 7 is non-rotatingly accommodated in the teeth 8 of the housing 2.

Each outer plate 7 is provided with two index recesses 13 and 14. The first index recess 13 is arranged so as to be in-phase with an aperture 16 and starts from the outer circumference 15 of the plate 7 and is essentially limited by a circular arch. The second index recess 14 is arranged so as to be circumferentially offset relative thereto and is positioned between two apertures 16 on half the pitch between the two apertures. Further index recesses 13a, 14a are diametrically opposite the two index recesses 13 and 14. The recesses are arranged opposite each other in order to avoid any out-of-balance during rotation.

The index recesses 13, 14 and 13a, 14a in FIG. 2 have identical dimensions, but in the case of the outer plate 7 illustrated in FIG. 3, the index recesses 14, 14a are smaller than the index recesses 13, 13a.

In a first assembly sequence for plates 7 for a viscous coupling 1 with low torque characteristics such as is used, for example, for a differential lock between the two driven wheels of a front wheel drive passenger car, the plates 7 are circumferentially aligned relative to the housing 2 so that the first index recesses 13 of all outer plates 7 arranged in an axial sequence along the axis of rotation X—X are arranged so as to be in-phase and form a kind of channel. This also applies to the second index recesses 14. Positioning of the plates may be checked by introducing a test bar 18, 19 into both channels formed by the index recesses 13 and 14, by means of which it is possible to determine whether the plates 7 are accurately aligned along the entire length of the housing 2, with the apertures 16 being in-phase relative to each other.

Figure 4:
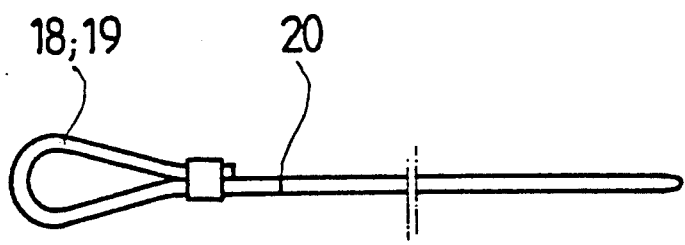
FIG. 4 shows a test bar.
Figure 5:
FIG. 5 is a cross-section through a test bar according to FIG. 4.

The test bar 18 illustrated in FIGS. 4 and 5 comprises a handle and a semi-circular bar which is adapted to the index recesses 13, 13a, 14, 14a of the outer plate 7. The two test bars 18, 19 differ in respect of the dimensions of the semi-circular side which is required for an outer plate 7 according to FIG. 3. Both test bars 18, 19 carry a mark 20 which indicates that the bar has passed through the index recesses 13, 14 of all outer plates 7 until it establishes contact with the cover 4, 5 of the viscous coupling 1.

If the viscous coupling to be assembled is to have a hump effect, the assembly of a first plate 7 is followed by the step of assembling a second plate 7 by turning it in such a way that the position of the first recess 13 of the first plate 7 is aligned relative to the second recess 14 of the second plate 7. This is followed by a further plate 7, with the first recess 13 being aligned relative to the other recesses 13, 14 aligned relative to each other. This order is followed over the entire length of the viscous coupling 1 and all plates 7 to be assembled in the housing 2. With this type of assembly, only one test bar 18 may be introduced because only one channel is formed along the entire depth of the housing. If the second index recesses 14 are designed to have a smaller cross-section deviating from the cross-section of the first recesses 13, only one test bar 19 may be introduced into the channel formed by the overlapping index recesses 13, 14, with the cross-section of the test bar 19 being adapted to the cross-section of the second index recesses 14. Accurate assembly is preferably tested with the help of a mark provided in the test bar 18, 19. As a result of the turning operation during assembly, there is no second test channel. The design of the plates 7 and the execution of the assembly method ensure that it is easy to check whether the correct assembly sequence and correct positioning of the plates in the housing have been achieved.

While the invention has been illustrated and described as embodied in a viscous coupling having plates with index recesses, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. A viscous coupling, comprising: a housing; at least one hub rotatably supported in said housing and relatively thereto; sets of plates which are associated with the housing and the at least one hub, which plates are arranged in a certain sequence and have apertures, the plates associated with the housing or hub being provided with index recesses for assembly purposes; and a viscous medium at least partially filling an internal space which remains between the housing and the hub and which is not occupied by the plates, two index recesses (13, 14) being provided per plate (7), which two index recesses include a first index recess (13) arranged so as to correspond to an aperture (16) in the plate, and a second index recess (14) arranged between two apertures (16) of the plate (7).

2. A viscous coupling according to claim 1, wherein the second index recess (14) is arranged centrally between two apertures (16).

3. A viscous coupling according to claim 1, wherein the first and second index recesses (13, 14) have different cross-sections.

4. A viscous coupling according to claim 1, wherein the second index recess (14) has a smaller cross-section than the first index recess (13).

5. A viscous coupling according to claim 1, and further comprising further index recesses (13a, 14a) diametrically opposed and identical to the two index recesses (13, 14).

6. A viscous coupling according to claim 1, wherein the two index recesses (13, 14) are provided in the plates (7) associated with the housing (2).

7. A viscous coupling according to claim 6, wherein the index recesses (13, 14) start from the outer circumference (15) of the plates (7).

* * * * *